(12) United States Patent
Leleannec et al.

(10) Patent No.: US 10,757,427 B2
(45) Date of Patent: Aug. 25, 2020

(54) METHOD AND DEVICE FOR OBTAINING COLOR DIFFERENCE COMPONENTS FOR COLOR PICTURE DATA

(71) Applicant: INTERDIGITAL VC HOLDINGS, INC., Wilmington, DE (US)

(72) Inventors: Fabrice Leleannec, Mouazé (FR); Sebastien Lasserre, Thorigné Fouillard (FR); Yannick Olivier, Thorigné Fouillard (FR); David Touze, Rennes (FR); Patrick Lopez, Livré sur Changeon (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 181 days.

(21) Appl. No.: 15/735,174

(22) PCT Filed: Jun. 7, 2016

(86) PCT No.: PCT/EP2016/062824
§ 371 (c)(1),
(2) Date: Dec. 9, 2017

(87) PCT Pub. No.: WO2016/198364
PCT Pub. Date: Dec. 15, 2016

(65) Prior Publication Data
US 2018/0160128 A1 Jun. 7, 2018

(30) Foreign Application Priority Data
Jun. 10, 2015 (EP) .................................... 15305887

(51) Int. Cl.
*G06K 9/00* (2006.01)
*H04N 19/186* (2014.01)
(Continued)

(52) U.S. Cl.
CPC ........... *H04N 19/186* (2014.11); *H04N 19/40* (2014.11); *H04N 19/44* (2014.11); *H04N 19/593* (2014.11)

(58) Field of Classification Search
CPC ....... H04N 19/186; H04N 19/40; H04N 19/44
See application file for complete search history.

(56) References Cited

U.S. PATENT DOCUMENTS 7,436,889 B2 * 10/2008 Moni ..................... H04N 19/61
 375/240
8,270,747 B2 * 9/2012 Isomura ................. H04N 19/50
 382/251
(Continued)

FOREIGN PATENT DOCUMENTS

CN 101534454 9/2009
JP 1994062431 3/1994
(Continued)

OTHER PUBLICATIONS

Lasserre et al., "High Dynamic Range video coding", Joint Collaborative Team on Video Coding (JCT-VC) of ITU-T SG 16 WP 3 and ISO/IEC JTC 1/SC 29/WG 11, Document JCTVC-P0159r1, 16th Meeting, San José, California, USA, Jan. 9, 2014, pp. 1-9.
(Continued)

*Primary Examiner* — Shefali D Goradia
(74) *Attorney, Agent, or Firm* — Invention Mine LLC (57) ABSTRACT

The present disclosure generally relates to a method and device for obtaining three color difference components from three components C1, C2 and C3 representing colors picture data in an input color space, a first of said color difference components being defined from the component C1, a second of said color difference components being defined from the first color difference component and the component C2, and a third of said color difference components being defined from the first color difference component and the component
(Continued)

C3. The method is characterized in that it further comprises: —obtaining a first component by applying a process to the component C1; —obtaining said first color difference component by applying the inverse process to the first component.

23 Claims, 3 Drawing Sheets

(51) Int. Cl.
    *H04N 19/40* (2014.01)
    *H04N 19/593* (2014.01)
    *H04N 19/44* (2014.01)

(56) References Cited

U.S. PATENT DOCUMENTS

| | | | |
|---|---|---|---|
| 8,553,768 | B2 | 10/2013 | Song |
| 9,167,247 | B2* | 10/2015 | Wahadaniah .......... H04N 19/50 |
| 2003/0012431 | A1* | 1/2003 | Irvine ..................... G06T 9/005 382/166 |
| 2009/0123066 | A1* | 5/2009 | Moriya ................. H04N 19/139 382/166 |
| 2009/0190659 | A1 | 7/2009 | Lee et al. |
| 2009/0268972 | A1* | 10/2009 | Yoon ...................... H04N 19/61 382/233 |
| 2012/0287995 | A1 | 11/2012 | Budagavi |
| 2013/0121415 | A1* | 5/2013 | Wahadaniah .......... H04N 19/50 375/240.12 |

FOREIGN PATENT DOCUMENTS

| | | |
|---|---|---|
| JP | 2009518940 | 5/2009 |
| JP | 2009177787 | 8/2009 |
| WO | WO2008004768 | 1/2008 |
| WO | WO2012160797 | 11/2012 |
| WO | WO2014007514 | 1/2014 |
| WO | WO2014166965 | 10/2014 |

OTHER PUBLICATIONS

Anonymous, "High Efficiency Video Coding", ITU-T H.265, Telecommunication Standardization Sector of ITU, Series H: Audiovisual and Multimedia Systems, Infrastructure of audiovisual services—Coding of moving video, Apr. 2013, pp. 1-317.

Anonymous, "Advanced video coding for generic audiovisual Services", ITU-T H.264, Telecommunication Standardization Sector of ITU, Series H: Audiovisual and Multimedia Systems, Infrastructure of audiovisual services—Coding of moving video, Feb. 2014, pp. 1-790.

Detlev Marpe et al., An Adaptive Color Transform Approach and Its Application in 4:4:4 Video Coding, Fraunhofer Institute for Telecommunications, Heinrich Hertz Institute, Image Processing Department, Einsteinufer 37, D-10587 Berlin, Germany, 14th European Signal Processing Conference (Eusipco 2006) Florence, Italy, Sep. 4-8, 2006.

Woo-Shik Kim et al., Inter-plane Prediction for RGB Coding, Joint Video Team (JVT) of ISO/IED MPEG & ITU-T VCEG (ISO/IEC JTC1/SC29/WG11 and ITU-T SG16 Q.6) PExt Ad Hoc Group Meeing Jul. 22-24, 2003, Trondheim.

Sebastien Lasserre et al., High Dynamic Range video Coding, Joint Collaborative Team on Video Coding (JCT-VC) of ITU-T SG 16 WP 3 and ISO/IEC JTC 1/SC 29/WG/11, 16th Meeting: San Jose, U.S., Jan. 9-17, 2014.

Ronan Boitard et al., Evaluation of Color Encodings for High Dynamic Range Pixels, Human Vision and Electronic Imaging XX, Spie vol. 9394, 93941K, 2015.

Machine translation of JP2009518940 cited above.

* cited by examiner

METHOD AND DEVICE FOR OBTAINING COLOR DIFFERENCE COMPONENTS FOR COLOR PICTURE DATA

This application claims the benefit, under 35 U.S.C. § 365 of International Application PCT/EP2016/062824, filed Jun. 7, 2016, which was published in accordance with PCT Article 21(2) on Dec. 15, 2016, in English, and which claims the benefit of European Patent Application No. 15305887.0, filed on Jun. 10, 2015.

1. FIELD

The present disclosure generally relates to obtaining color differences for color picture data represented, for example, in the CIEXYZ, CIELab or any color spaces.

2. BACKGROUND

The present section is intended to introduce the reader to various aspects of art, which may be related to various aspects of the present disclosure that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Encoding (obtaining) color differences (color difference components) for color picture data belonging to an input three dimensional color space (C1, C2, C3) stands for representing the triplets of the color picture data in an output three dimensional color space (D1, D2, D3) where D1 is a first component defined from the component D1, D2 is a first color difference component defined from the component C2 and the component C1, and D3 is a second color difference component defined from the component C3 and the component C1.

The CIEXYZ or RGB color spaces are examples of input color space and the CIELab or YDzDx ("*WD SMPTE Standard: YDzDx Color-Difference Encoding for XYZ integer signals*", version 1.06 of 2014 Mar. 3) color spaces are examples of the output color space but the disclosure is not limited to any input and/or output specific color space.

According to prior art, encoding color differences comprises color-transforming the triplets of color picture data to triplets of the three dimensional space and quantizing said color-transformed triplets.

Figure 1:
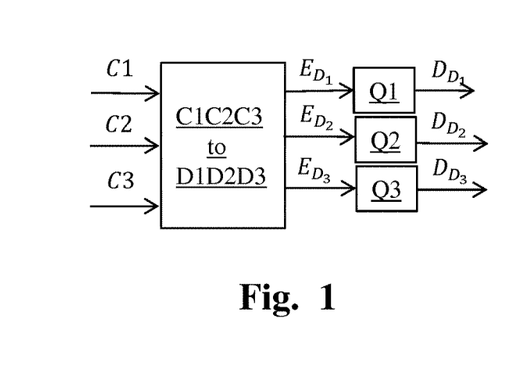
FIG. 1 shows a block diagram of the steps of a method for encoding color differences for color picture data in accordance with prior art.

More precisely, as illustrated in FIG. 1, a module C1C2C3-to-D1D2D3 is configured to obtain triplets ($E_{D_1}$, $E_{D_2}$, $E_{D_3}$) of floating point values by color-transforming the triplets (C1, C2, C3) of the input color space according to equations (1):

$$E_{D_1} = F1(C_1)$$

$$E_{D_2} = F2(C_2, C_1)$$

$$E_{D_3} = F3(C_3, C_1) \quad (1)$$

where F1( ), F2( ) and F3( ) represent color-transform functions implemented by the module C1C2C3-to-D1D2D3.

Next, modules Q1, Q2 and Q3 are configured to obtain the triplets ($D_{D_1}$, $D_{D_2}$, $D_{D_3}$) of integer values of the output color space by quantizing the triplets ($E_{D_1}$, $E_{D_2}$, $E_{D_3}$) according to equations (2):

$$D_{D_1} = Q1(E_{D_1})$$

$$D_{D_2} = Q2(E_{D_2})$$

$$D_{D_3} = Q3(E_{D_3}) \quad (2)$$

where Q1( ), Q2( ) and Q3( ) represents the quantizing functions implemented by the modules Q1, Q2 and Q3 respectively.

Note in the following, the notation $E_A$ stands for a floating point version of a value A and $D_A$ stands for an integer (digital) version of a value A.

According to an example, when the input color space is the CIEXYZ color space (C1=Y, C2=X and C3=Z) and the output color space is the CIELab1976 color space (D1=L, D2=a*, D3=b*), the triplets (X,Y,Z) are color-transformed according to equations (3):

$$E_{D_1} = L = F1(Y) = 116Y - 16$$

$$E_{D_2} = a^* = F2(X, Y) = 500(X - Y)$$

$$E_{D_3} = b^* = F3(Z, Y) = 200(Y - Z) \quad (3)$$

The triplets ($E_{D_1}$, $E_{D_2}$, $E_{D_3}$) given by equation (3) are then quantized according to equations (4):

$$D_{D_1} = Q1(E_{D_1}) = INT\left[\left(876 \cdot \left(\frac{E_{D_1} - E_{D_1 min}}{E_{D_1 peak} - E_{D_1 min}}\right) + 64\right) \cdot 2^{n-10}\right] \quad (4)$$

$$D_{D_2} = Q2(E_{D_2}) = INT\left[\left(896 \cdot \left(\frac{E_{D_2}}{E_{D_2 peak} - E_{D_2 min}}\right) + 512\right) \cdot 2^{n-10}\right]$$

$$D_{D_3} = Q3(E_{D_3}) = INT\left[\left(896 \cdot \left(\frac{E_{D_3}}{E_{D_3 peak} - E_{D_3 min}}\right) + 512\right) \cdot 2^{n-10}\right]$$

where $E_{Dipeak}$ and $E_{Dimin}$ (i=1, 2, 3) respectively stand for a predefined peak (bound) and a minimum for a color component $ED_i$.

These upper and lower bounds can be determined according to the range of a component of the color picture values in order, for example, to be supported by a coding scheme.

According to another example, when the input color space is the CIEXYZ color space (C1=Y, C2=X and C3=Z) and the output color space is the YDzDx color space, the triplets (X, Y, Z) are color-transformed according to equations (5):

$$E_{D_1} = F1(Y)$$

$$E_{D_2} = F2(X, Y) = \frac{X - c_2 Y}{2.0}$$

$$E_{D_3} = F3(Z, Y) = \frac{c_1 Z - Y}{2.0}$$

$$c_1 = \frac{2763}{2800}$$

$$c_2 = \frac{2741}{2763} \quad (5)$$

The triplets ($E_{D_1}$, $E_{D_2}$, $E_{D_3}$) given by equations (5) are then quantized according to equations (6):

$$D_{D_1} = Q1(E_{D_1}) = INT[(876 \cdot E_{D_1} + 64) \cdot 2^{n-10}]$$

$$D_{D_2} = 122(E_{D_2}) = INT[(896 \cdot E_{D_2} + 512) \cdot 2^{n-10}]$$

$$D_{D_3} = 123(E_{D_3}) = INT[(896 \cdot E_{D_3} + 512) \cdot 2^{n-10}] \quad (6)$$

Figure 2:
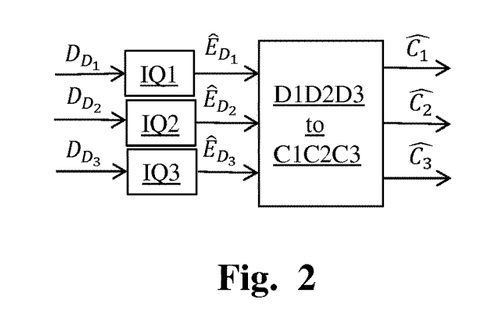
FIG. 2 shows a block diagram of the steps of a method for decoding color differences in accordance with prior art.

Decoding the triplets ($D_{D_1}$, $D_{D_2}$, $D_{D_3}$) of color differences which belong to the output color space (obtained as explained above in relation with FIG. 1) is the mathematical inverse of the encoding of said color differences as illustrated in FIG. 2.

Modules IQ1, IQ2 and IQ3 are configured to obtain inverse-quantized triplets ($\hat{E}_{D_1}, \hat{E}_{D_2}, \hat{E}_{D_3}$) by inverse-quantizing the triplets ($D_{D_1}, D_{D_2}, D_{D_3}$) and a module D1D2D3-to-C1C2C3 is configured to obtain triplets of decoded color picture data ($\hat{C}_1, \hat{C}_2, \hat{C}_3$) by inverse-transforming the inverse-quantized triplets ($\hat{E}_{D_1}, \hat{E}_{D_2}, \hat{E}_{D_3}$).

Equations (7) define the combination of the inverse-quantizing and inverse-transforming operations:

$$\hat{C}_1 = IF1(IQ1(D_{D_1}))$$

$$\hat{C}_2 = IF2(1Q2(D_{D_2}), IQ1(D_{D_1}))$$

$$\hat{C}_3 = IF3(IQ3(D_{D_3}), IQ1(D_{D_1})) \quad (7)$$

where IF1( ), respectively IF2( ) and IF3( ), represents the inverse of the color-transform function F1( ), respectively F2( ) and F30 implemented by the module C1C2C3-to-D1D2D3 and IQ1( ), respectively IQ2( ) and IQ3( ), represents the inverse of the quantizing functions Q10, respectively Q2( ) and Q3( ).

According to an example, when the input color space is the CIEXYZ color space (C1=Y, C2=X and C3=Z) and the output color space is the CIELab1976 color space (D1=L, D2=a*, D3=b*), the triplets ($\hat{C}_2 = 2, \hat{C}_1 = \hat{Y}, \hat{C}_3 = \hat{Z}$) of decoded color picture data are obtained according to equations (8):

$$\hat{E}_{D_1} = IQ1(D_{D_1}) = \frac{1}{876}\left(\frac{D_{D_1}}{2^{n-10}} - 64\right) \cdot (E_{D1peak} - E_{D1min}) + E_{D1min} \quad (8)$$

$$\hat{E}_{D_2} = IQ2(D_{D_2}) = \frac{1}{448}\left(\frac{D_{D_2}}{2^{n-10}} - 512\right) \cdot (E_{D2peak} - E_{D2min}) + E_{D2min}$$

$$\hat{E}_{D_3} = IQ3(D_{D_3}) = \frac{1}{448}\left(\frac{D_{D_3}}{2^{n-10}} - 512\right) \cdot (E_{D3peak} - E_{D3min}) + E_{D3min}$$

$$\hat{C}_1 = IF1(IQ1(D_{D_1})) = \frac{\hat{E}_{D_1}+16}{116}$$

$$\hat{C}_2 = IF2(IQ2(D_{D_2}), IQ1(D_{D_1})) = \frac{\hat{E}_{D_2}}{500} + \left(\frac{\hat{E}_{D_1}+16}{116}\right)$$

$$\hat{C}_3 = IF3(IQ3(D_{D_3}), IQ1(D_{D_1})) = \left(\frac{\hat{E}_{D_1}+16}{116}\right) - \frac{\hat{E}_{D_3}}{200}$$

According to another example, when the input color space is the CIEXYZ color space (C1=Y, C2=X and C3=Z) and the output color space is the YDzDx color space, the triplets ($\hat{C}_2 = \hat{X}, \hat{C}_1 = \hat{Y}, \hat{C}_3 = \hat{Z}$) of decoded color picture data are obtained according to equations (9):

$$\hat{X} = \frac{2}{876}\left(\frac{D_{D_2}}{2^{n-10}} - 512\right) + \frac{d_1}{876}\left(\frac{D_{D_1}}{2^{n-10}} - 64\right) \quad (9)$$

$$\hat{Y} = \frac{1}{876}\left(\frac{D_{D_1}}{2^{n-10}} - 64\right)$$

$$\hat{Z} = d_2\left(\frac{2}{876}\left(\frac{D_{D_3}}{2^{n-10}} - 512\right) + \frac{1}{876}\left(\frac{D_{D_1}}{2^{n-10}} - 64\right)\right)$$

where d1=2741/2763 and d2=2800/2763.

According to the prior art, encoding color differences involves calculating color differences (equations (1), (3) or (5) for example) between the component C2 (respectively C3) and the component C1 but decoding color differences involves calculating sums between the color difference components $D_{D_2}$ (respectively $D_{D_3}$) and $D_{D_1}$ as illustrated by equations (8) or (9) for example. Those color difference components $D_{D_2}$ (respectively $D_{D_3}$) are quantized versions of the color-transformed version of the component C2 (respectively C3) and the sums are thus calculated between quantized components but the color differences are calculated between non-quantized versions of the components. Consequently, encoding/decoding color differences according to the prior art involves cumulating quantizing errors that lead to errors on the triplets ($\hat{X}, \hat{Y}, \hat{Z}$) of the decoded color picture data.

3. SUMMARY

In light of the foregoing, aspects of the present disclosure are directed to creating and maintaining semantic relationships between data objects on a computer system. The following presents a simplified summary of the disclosure in order to provide a basic understanding of some aspects of the disclosure. This summary is not an extensive overview of the disclosure. It is not intended to identify key or critical elements of the disclosure. The following summary merely presents some aspects of the disclosure in a simplified form as a prelude to the more detailed description provided below.

According to one of its aspects, the present disclosure relates to a method for obtaining three color difference components from three components C1, C2 and C3 representing colors picture data in an input color space, a first of said color difference components being defined from the component C1, a second of said color difference components being defined from the first color difference component and the component C2, and a third of said color difference components being defined from the first color difference component and the component C3. The method comprises:

obtaining a first component by applying a process to the component C1;

obtaining said first color difference component by applying the inverse process to said first component.

According to an embodiment, the process applied to the component C1 comprises a quantizing of the component C1 and the inverse process applied to the first component comprises an inverse-quantizing of the first component.

Using a quantized-and-inverse-quantized version of the component C1 rather than the component C1 for computing the color differences avoids cumulative quantizing errors because the quantizing error on the component C1 is taken into account to calculate the color differences.

According to an embodiment, the process applied to the component C1 comprises an encoding of the component C1 and the inverse process applied to the first component comprises a decoding of the first component.

According to an embodiment, the process applied to the component C1 comprises a quantizing of the component C1 followed by an encoding of the quantized component C1 and the inverse process applied to the first component comprises a decoding of the first component followed by an inverse-quantizing of the decoded component.

According to an embodiment, the method further comprises applying a transfer function on the color picture data in order to obtain non-linear color picture data.

According to an embodiment, the method further comprises inverse-quantizing each component of the color picture data before applying the process to the component C1.

According to an embodiment, the input color space is the CIEXYZ color space or the YDzDx color space.

According to another of its aspects, the present disclosure relates to a method for encoding color picture data which comprises obtaining color differences for said color picture data according to a method above.

According to an embodiment, the obtaining of a first component by applying a process to the component C1 comprises calculating a residual of the component C1 of color picture data.

According to an embodiment, when the component C1 is the luma component of the color picture color data, the residual of the luma component of color picture data is calculated by subtracting a low spatial frequency version of the luma component of the color picture data to said luma component of the color picture.

According to an embodiment, when the component C1 is the luma component of the color picture color data, the residual of the luma component of color picture data is calculated by dividing the luma component of the color picture data by a backlight component.

According to other of its aspects, the disclosure relates to a computer program product comprising program code instructions to execute the steps of the above method when this program is executed on a computer, a processor readable medium having stored therein instructions for causing a processor to perform at least the steps of the above method, and a non-transitory storage medium carrying instructions of program code for executing steps of the above method when said program is executed on a computing device.

The specific nature of the disclosure as well as other objects, advantages, features and uses of the disclosure will become evident from the following description of embodiments taken in conjunction with the accompanying drawings.

4. BRIEF DESCRIPTION OF DRAWINGS

In the drawings, an embodiment of the present invention is illustrated. It shows.

Similar or same elements are referenced with the same reference numbers.

5. DESCRIPTION OF EMBODIMENTS

The present disclosure will be described more fully hereinafter with reference to the accompanying figures, in which embodiments of the disclosure are shown. This disclosure may, however, be embodied in many alternate forms and should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Although some of the diagrams include arrows on communication paths to show a primary direction of communication, it is to be understood that communication may occur in the opposite direction to the depicted arrows.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "one embodiment" or "an embodiment" means that a particular feature, structure, or characteristic described in connection with the embodiment can be included in at least one implementation of the disclosure. The appearances of the phrase "in one embodiment" or "according to an embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

While not explicitly described, the present embodiments and variants may be employed in any combination or sub-combination.

In the following, a picture (sometimes called an image or frame in prior art) contains one or several arrays of samples (pixel values) in a specific picture/video format which specifies all information relative to the pixel values of a picture (or a video) and all information which may be used by a display and/or a decoding device to visualize and/or decode a picture (or video). A picture comprises at least one component, in the shape of a first array of samples, usually a luma (or luminance) component, and, possibly, at least one other component, in the shape of at least one other array of samples, usually a color component.

The disclosure is described for encoding/decoding a picture but extends to the encoding/decoding of a sequence of pictures (video) because each picture of the sequence is sequentially encoded/decoded as described below.

According to the principle of the disclosure, the method for encoding color differences for color picture data, as described in the introducing part in relation with FIG. 1, further comprises:

- obtaining a first component by applying a process to the component C1;
- obtaining a second component $\widehat{E_{o_1}}$ by applying the inverse process to the first component; and
- the first and second color difference components are further defined from the second component.

Figure 3:
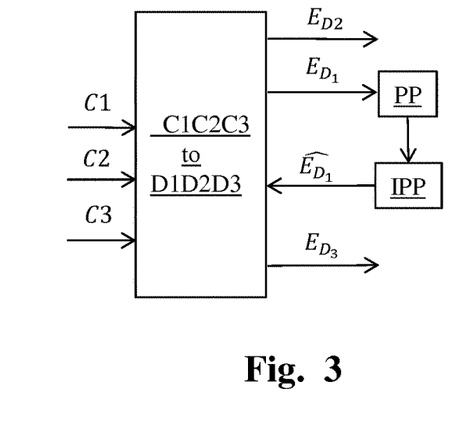
FIG. 3 shows a block diagram of the steps of a method for encoding color differences for color picture data in accordance with an example of the present principles.

More precisely, a module PP is configured to obtain a first component by applying a process pro to the component $E_{D_1}$ and a module IPP is configured to obtain a second component $\widehat{E_{o_1}}$ by applying the inverse process IPP (inverse of the process PP) to said first component as follows:

$$\widehat{E_{o_1}} = IPP(PP(E_{D_1}))$$

The module C1C2C3-to-D1D2D3 is then configured to obtain triplets $(E_{D_1}, E_{D_2}, E_{D_3})$ by color-transforming the triplets (C1, C2, C3) of the input color space (C1, C2, C3) according to equations (10):

$$E_{D_1} = F1(C1)$$
$$E_{D_2} = F2(C_2, \widehat{E_{o_1}})$$
$$E_{D_3} = F3(C_3, \widehat{E_{o_1}}) \tag{10}$$

Equation (10) shows that the component $E_{D_1}$ is defined from the component C1 in first, next the second component $\widehat{E_{o_1}}$ is obtained and finally, the color difference components $E_{D_2}$ and $E_{D_3}$ are obtained from the components C2 and C3 and the second component $\widehat{E_{o_1}}$.

According to an example, when the input color space is the CIEXYZ color space (C1=Y, C2=X and C3=Z) and the output color space is the CIELab1976 color space (D1=L, D2=a*, D3=b*), the triplets (X, Y, Z) are color-transformed according to equations (11):

$$E_{D_1} = L = F1(Y) = 116 C_1 - 16 = 116 Y - 16 \tag{11}$$
$$\widehat{E_{o_1}} = \hat{Y} = IPP(PP(E_{D_1}))$$
$$E_{D_2} = a^* = F2(X, \hat{Y}) = 500\left(C_2 - \left(\frac{E_{D_1} + 16}{116}\right)\right) = 500\left(X - \left(\frac{\hat{Y}+16}{116}\right)\right)$$
$$E_{D_3} = b^* = F3(Z, \hat{Y}) = 200\left(\left(\frac{E_{D_1}+16}{116}\right) - C_3\right) = 200\left(\left(\frac{\hat{Y}+16}{116}\right) - Z\right)$$

where $D_1^{peak}$ and $D_1^{min}$ respectively stand for a predefined peak (bound) and a minimum for the color component.

According to a variant, the triplets $(E_{D_1}, E_{D_2}, E_{D_3})$ is approximated by the following equations:

$$E_{D_2} = a^* = F2(X, \hat{Y}) = 500(X - ((\hat{Y}+16)/116))$$
$$E_{D_3} = b^* = F3(Z, \hat{Y}) = 200(((\hat{Y}+16)/116) - Z) \tag{12}$$

According to another example, when the input color space is the CIEXYZ color space (C1=Y, C2=X and C3=Z) and the output color space is the YDzDx color space, the triplets (X, Y, Z) are color-transformed according to the following equations:

$$E_{D_1} = F1(Y)$$
$$\widehat{E_{o_1}} = \hat{Y} = IPP(PP(E_{D_1}))$$
$$E_{D_2} = F2(X, Y) = \frac{X - c_2 \hat{Y}}{2.0}$$
$$E_{D_3} = F3(Z, Y) = \frac{c_1 Z - \hat{Y}}{2.0}$$
$$c_1 = \frac{2763}{2800}$$
$$c_2 = \frac{2741}{2763}$$

Possibly, triplets $(D_{D_1}, D_{D_2}, D_{D_3})$ of integer values of the output color space are then obtained by quantizing the triplets $(E_{D_1}, E_{D_2}, E_{D_3})$ according to equations (2).

The triplets $(D_{D_1}, D_{D_2}, D_{D_3})$ of color differences are decoded according to equation (7).

According to an embodiment, the process PP applied to the component C1 comprises a quantizing of the component C1 and the inverse process IPP applied to the first component comprises an inverse-quantizing of the first component.

Advantageously, this embodiment avoids cumulating the quantizing error on the component C1 for encoding the color differences and then increases the performance of the color difference encoding.

According to an embodiment, the process PP applied to the component C1 comprises an encoding of the component C1 and the inverse process IPP applied to the first component comprises a decoding of the first component.

Advantageously, this embodiment avoids cumulating the coding error, introduced by the encoding and decoding operations E/D, of the component C1 for encoding the color differences and then increases the performance of the color difference encoding.

According to an embodiment, the process PP applied to the component C1 comprises an video encoding of a spatial block of the component C1 and the inverse process IPP applied to the first component comprises a video decoding (e.g. HEVC) of said spatial block of the first component.

The encoding operation E may be implemented in an encoder ENC1 adapted to encode a component of color picture data and the decoding operation D may be implemented by a decoder DEC1 adapted to decode a component of color picture data.

According to an embodiment, the process PP applied to the component C1 comprises a quantizing of the component C1 followed by an encoding of the quantized component C1 and the inverse process IPP applied to the first component comprises a decoding of the first component followed by an inverse-quantizing of the decoded component.

Advantageously, this embodiment avoids cumulating the coding error and the quantizing error on the component C1 for encoding the color differences and then increases the performance of the color difference encoding.

Figure 3A:
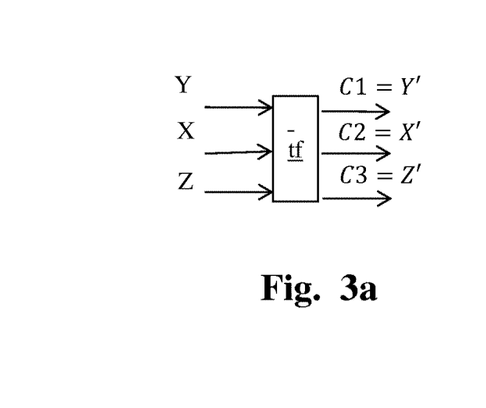
FIG. 3a shows a block diagram of the steps of a method for encoding color differences for color picture data in accordance with an example of the present principles.

According to a variant, illustrated in FIG. 3a, when the input color space is the CIEXYZ color space (C1=Y, C2=X and C3=Z), the method further comprises obtaining triplets (X', Y', Z') of color picture data by applying a transfer function tf onto the triplets (X,Y,Z) of the CIEXYZ color space, and color differences are then encoded from the triplets (X', Y', Z') of color picture data according to equations (11) or (12).

An exemplary transfer function tf is the inverse Electro-Optical Transfer Function (inverse EOTF noted $f_{EOTF}^{-1}$) described in SMPTE "FCD SMPTE Standard High Dynamic Range Electro-Optical Transfer Function of Mastering Reference Displays, SMPTE ST2084:201X, Version 1.24—of 2014-06-18". It is given by the following equations;

$$X' = f_{EOTF}^{-1}(X) = \left(\frac{c_1 + c_2 X^{m_1}}{1 + c_3 X^{m_1}}\right)^{m_2}$$

$$Y' = f_{EOTF}^{-1}(X) = \left(\frac{c_1 + c_2 Y^{m_1}}{1 + c_3 Y^{m_1}}\right)^{m_2}$$

$$Z' = f_{EOTF}^{-1}(X) = \left(\frac{c_1 + c_2 Z^{m_1}}{1 + c_3 Z^{m_1}}\right)^{m_2}$$

where
$m_1$ is the number 2610/4096×¼=0.1593017578125
$m_2$ is the number 2523/4096×128=78.84375
$c_1$ is the number 3424/4096=0.8359375=$c_3-c_2+1$
$c_2$ is the number 2413/4096×32=18.8515625
$c_3$ is the number 2392/4096×32=18.6875
Another exemplary transfer function tf is given by:

$$X' = f\left(\frac{X}{X_n}\right)$$

$$Y' = f\left(\frac{Y}{Y_n}\right)$$

$$Z' = f\left(\frac{Z}{Z_n}\right)$$

where (Xn, Yn, Zn) are triplets representing the environment used to visualize the color picture data.

For example, the transfer function f is mainly a gamma function with an exponent equal to ⅓, i.e:

$$f(r) = r^{1/3} \quad \text{if } r > \left(\frac{6}{29}\right)^3$$

$$f(r) = \frac{1}{3}*\left(\frac{29}{6}\right)^2*r + \frac{4}{29} \quad \text{otherwise}$$

Note that for high dynamic range content for example, the transfer function f may be of a different form from the gamma function shown above.

Figure 3B:
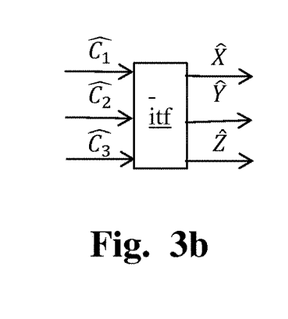
FIG. 3b shows a block diagram of the steps of a method for decoding color differences for color picture data in accordance with an example of the present principles.

FIG. 3b illustrates the decoding of color differences according to this variant.

Figure 3C:
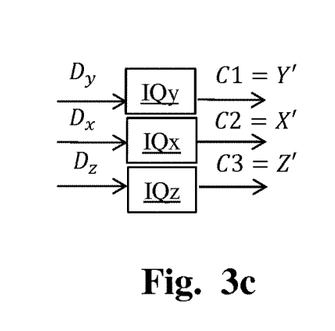
FIG. 3c shows a block diagram of the steps of a method for encoding color differences for color picture data in accordance with a variant of the examples of the present principles described in relation with FIG. 3, 3a or 3b.

Because a transfer function tf has been applied onto the triplets (X,Y,Z) of the CIEXYZ color space, the method further comprises obtaining the triplets ($\widehat{C_1}$, $\widehat{C_2}$, $\widehat{C_3}$) by applying an inverse transfer function itf onto the triplets ($\hat{X}$, $\hat{Y}$, $\hat{Z}$) according to the following equations:

$\hat{Y}=f_{EOTF}(\widehat{C_1})$ $\hat{X}=f_{EOTF}(\widehat{C_2})$ $\hat{Z}=f_{EOTF}(\widehat{C_3})$ In the case of the Lab color space the inverse transfer function itf takes the following form:

$\hat{Y}=Y_n \cdot f^{-1}(\widehat{C_1})$ $\hat{X}=X_n \cdot f^{-1}(\widehat{C_2})$ $\hat{Z}=Z_n \cdot f^{-1}(\widehat{C_3})$ According to a variant, illustrated in FIG. 3c, when the input color space is the CIEXYZ color space (C1=Y, C2=X and C3=Z) and when an integer (quantized) version ($D_x$, $D_y$, $D_z$) of the triplets (X, Y, Z) is available rather than the triplets (X, Y, Z) of floating point values, the method further comprises obtaining triplets (X', Y', Z') of color picture data by inverse quantizing the triplets ($D_x$, $D_y$, $D_z$) according to equations (13), and color differences are encoded from the triplets (X', Y', Z') according to the equations (11) and (12):

$X'=IQx(D_x)$ $Y'=IQy(D_y)$ $Z'=IQz(D_z)$ (13)

According to a non-restrictive example, the modules IQx, IQy, IQz, usually called inverse code mapping in SMPTE ST 2085, and which are configured to implement the inverse quantization of equations (13), takes the following form:

$$X' = \left(\frac{Dx}{2^{n-10}} - 64\right)$$

$$Y' = \left(\frac{Dy}{2^{n-10}} - 64\right)$$

$$Z' = \left(\frac{Dz}{2^{n-10}} - 64\right)$$

Note that (X, Y, Z) are triplets of linear data, i.e. this data is proportional to the amount of light received by a given sensor in each component (X,Y,Z), and (X', Y', Z') are triplets of non-linear data, i.e. data represented after having transformed each linear light component (X,Y,Z) with a non-linear function (perceptual curve). Consequently, when the triplets (X', Y', Z') are considered as input of the method for encoding color differences, the color differences are calculated in a non-linear domain.

Encoding color differences for color picture data may be used in combination with any encoding/decoding color picture data.

Figure 4A:
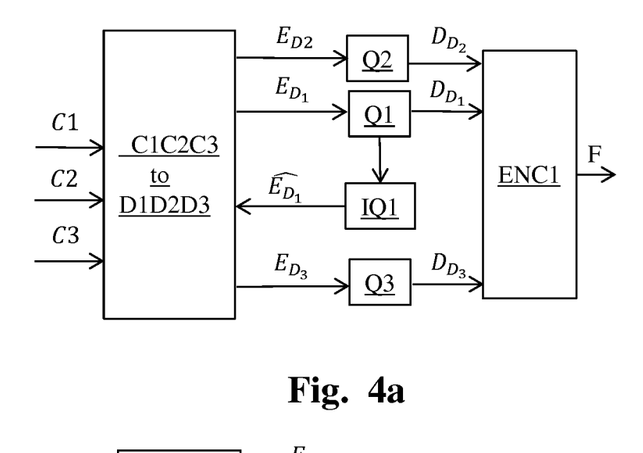
FIG. 4a shows a block diagram of the steps of a method for encoding color picture data in accordance with an example of the present principles.
Figure 4B:
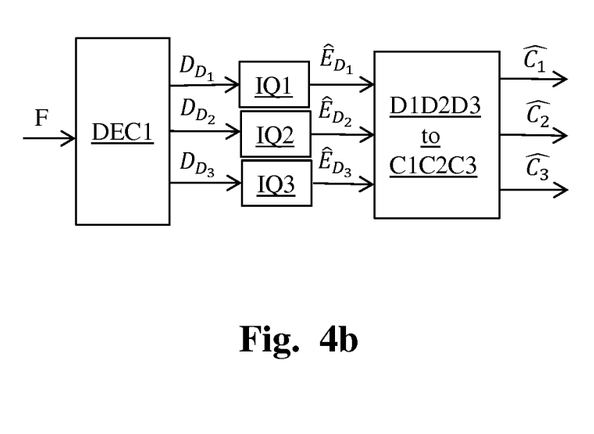
FIG. 4b shows a block diagram of the steps of a method for decoding picture data in accordance with an example of the present principles.

According to an embodiment of the encoding/decoding scheme, as illustrated in FIGS. 4a and 4b, the encoding scheme comprises a module Q1 configured to obtain a first component $D_{D_1}$ by applying a quantizing to the component $E_{D_1}$ (process PP) and a module IQ1 configured to apply an inverse-quantizing to the first component $D_{D_1}$ (process IPP).

Moreover, the encoding scheme comprises modules Q2 and Q3 configured to obtain components $D_{D_2}$ and $D_{D_3}$ by applying a quantizing to the components $E_{D_2}$ and $E_{D_3}$.

The triplets ($D_{D_1}$, $D_{D_2}$, $D_{D_3}$) of integer color picture data are then input of an encoder ENC1 adapted to encode these triplets of color picture data into a bitstream F.

According to an embodiment of the decoding scheme, illustrated in FIG. 4b, the decoding scheme comprises a decoder DEC1 configured to obtain the components ($\widehat{E_{D_1}}, \widehat{D_{D_2}}, \widehat{D_{D_3}}$) of integer color picture data by decoding the bitstream F and, the decoding scheme further comprises modules D1 D2D3-to-C1C2C3 and IQ1, IQ2, IQ3 to obtain the triplets ($\widehat{C_1}, \widehat{C_1}, \widehat{C_1}$) of decoded color picture from the triplets ($D_{D_1}$, $D_{D_2}$, $D_{D_3}$) as described in relation with FIG. 2.

Note that according to this embodiment, the input of the encoder ENC1 and the output of the decoder DEC1 are integer point values.

Figure 4C:
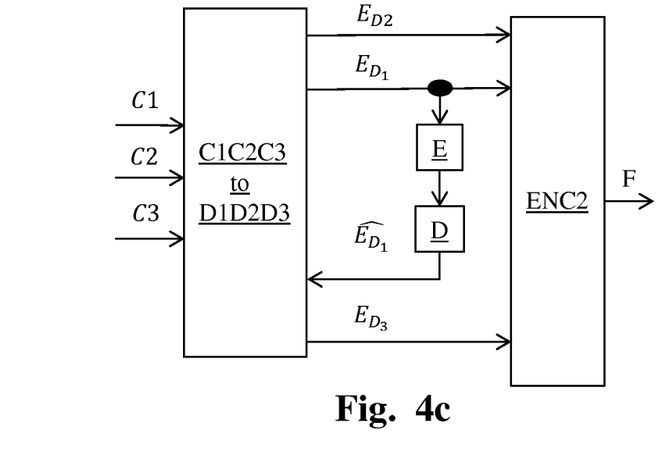
FIG. 4c shows a block diagram of the steps of a method for encoding color picture data in accordance with an example of the present principles.
Figure 4D:
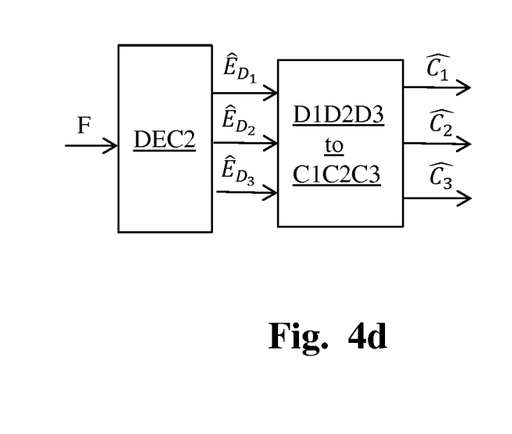
FIG. 4d shows a block diagram of the steps of a method for decoding picture data in accordance with an example of the present principles.

According to an embodiment of the encoding/decoding scheme, as illustrated in FIGS. 4c and 4d, the encoding scheme comprises an encoder E configured to obtain a first component by encoding the component $E_{D_1}$ (process PP) and a decoder D configured to decode the first component (process IPP).

Moreover, the encoding scheme comprises an encoder ENC2 adapted to encode the triplets ($E_{D_1}$, $E_{D_2}$, $E_{D_3}$) of floating point color picture data into a bitstream F.

According to a variant, only the components ($E_{D_2}$,$E_{D_3}$) are processed by the encoder ENC2, since $E_{D_1}$ has already been encoded.

According to a variant of this embodiment, the encoding scheme comprises means for calculating a residual, called component $E_{D_1}$, of the component C1 of color picture data.

When the component C1 is the luma component of the color picture data, such a residual may be calculated by subtracting a low spatial frequency version of the luma component of the color picture data to said luma component of the color picture data.

Such a residual may also be calculated by dividing the luma component of the color picture data by a backlight component.

According to an embodiment of the decoding scheme, illustrated in FIG. 4d, the decoding scheme comprises a decoder DEC2 configured to obtain the triplets ($\widehat{E_{D_1}}, \widehat{E_{D_1}}, \widehat{E_{D_1}}$) of decoded color picture, and the decoding scheme further comprises modules D1 D2D3-to-C1C2C3 to obtain the triplets ($\widehat{C_1}, \widehat{C_1}, \widehat{C_1}$) of decoded color picture from the triplets ($\widehat{E_{D_1}}, \widehat{E_{D_1}}, \widehat{E_{D_1}}$) as described in relation with FIG. 2.

Note that according to this embodiment, the input of the encoder ENC2 and the output of the decoder DEC2 are floating point values.

Figure 4E:
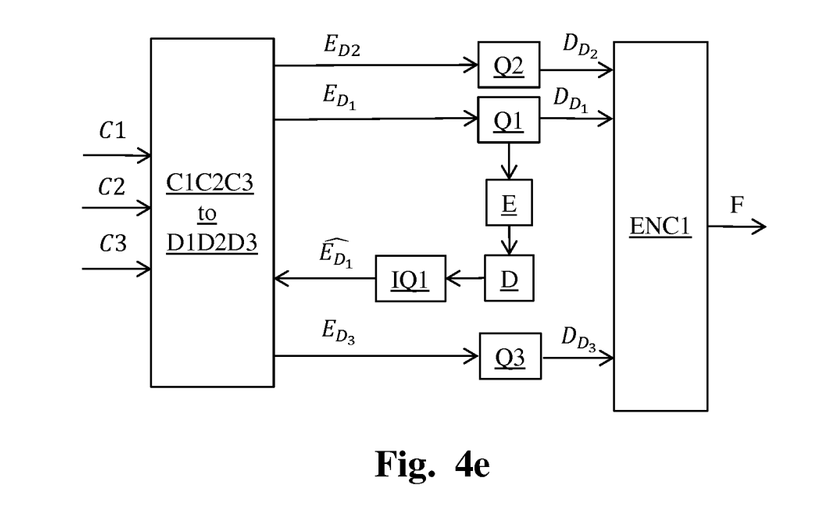
FIG. 4e shows a block diagram of the steps of a method for encoding color picture data in accordance with an example of the present principles.

According to an embodiment of the encoding/decoding scheme, as illustrated in FIG. 4e, the encoding scheme comprises a module Q1 configured to obtain an intermediate component by applying a quantizing to the component $E_{D_1}$ and an encoder E configured to obtain a first component by encoding said intermediate component (process PP). The encoding scheme further comprises a decoder D configured to decode the first component and a module IQ1 configured to apply an inverse-quantizing to the first decoded component (process IPP).

Moreover, the encoding scheme comprises modules Q2 and Q3 configured to obtain components $D_{D_2}$ and $D_{D_3}$ by applying a quantizing to the components $E_{D_2}$ and $E_{D_3}$.

The triplets ($D_{D_1}$, $D_{D_2}$, $D_{D_3}$) of integer color picture data are then input of an encoder ENC1 adapted to encode these triplets of color picture data into a bitstream F.

The decoding scheme is the same as described in FIG. 4b.

The decoder D (respectively DEC1, DEC2) is configured to decode data which have been encoded by the encoder D (respectively ENC1, ENC2). The encoder E and/or ENC1 and/or ENC2 (and decoder D and/or DEC1 and/or DEC2) may be block-based processing.

The encoders E and/or ENC1 and/or ENC2 (and decoder E and/or DEC1 and/or DEC2) is not limited to a specific encoder (decoder).

The encoder E and/or ENC1 and/or ENC2 (and decoder D and/or DEC1 and/or DEC2) is not limited to a specific encoder which may be, for example, an image/video coder with loss like JPEG, JPEG2000, MPEG2, HEVC recommendation ("*High Efficiency Video Coding*", SERIES H: AUDIOVISUAL AND MULTIMEDIA SYSTEMS, Recommendation ITU-T H.265, Telecommunication Standardization Sector of ITU, April 2013) or H264/AVC recommendation ("*Advanced video coding for generic audiovisual Services*", SERIES H: AUDIOVISUAL AND MULTIMEDIA SYSTEMS, Recommendation ITU-T H.264, Telecommunication Standardization Sector of ITU, February 2014)).

On FIG. 1-4e, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the invention are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 5:
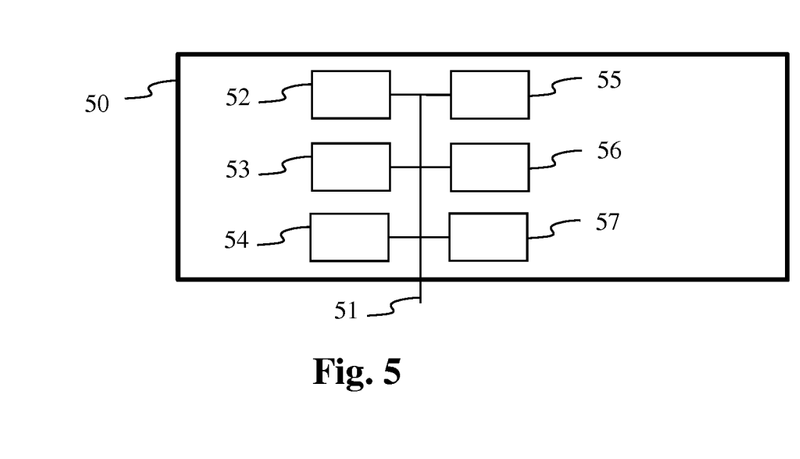
FIG. 5 shows an example of an architecture of a device in accordance with an example of present principles.

FIG. 5 represents an exemplary architecture of a device 50 which may be configured to implement a method described in relation with FIG. 3-4e.

Device 50 comprises following elements that are linked together by a data and address bus 51:
- a microprocessor 52 (or CPU), which is, for example, a DSP (or Digital Signal Processor);
- a ROM (or Read Only Memory) 53;
- a RAM (or Random Access Memory) 54;
- an I/O interface 55 for reception of data to transmit, from an application; and
- a battery 56.

According to a variant, the battery 56 is external to the device. In each of mentioned memory, the word «register» used in the specification can correspond to area of small capacity (some bits) or to very large area (e.g. a whole program or large amount of received or decoded data). ROM 53 comprises at least a program and parameters. Algorithm of the methods according to the invention is stored in the ROM 53. When switched on, the CPU 52 uploads the program in the RAM and executes the corresponding instructions.

RAM 54 comprises, in a register, the program executed by the CPU 52 and uploaded after switch on of the device 50, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

According to a specific embodiment of encoding or encoder, the triplets (C1, C2, C3) or (X, Y, Z) or ($D_x$, $D_y$, $D_z$) of color picture data are obtained from a source. For example, the source belongs to a set comprising:
  a local memory (53 or 54), e.g. a video memory or a RAM (or Random Access Memory), a flash memory, a ROM (or Read Only Memory), a hard disk;
  a storage interface (55), e.g. an interface with a mass storage, a RAM, a flash memory, a ROM, an optical disc or a magnetic support;
  a communication interface (55), e.g. a wireline interface (for example a bus interface, a wide area network interface, a local area network interface) or a wireless interface (such as a IEEE 802.11 interface or a Bluetooth® interface); and
  a picture capturing circuit (e.g. a sensor such as, for example, a CCD (or Charge-Coupled Device) or CMOS (or Complementary Metal-Oxide-Semiconductor)).

According to different embodiments of the decoding or decoder, the output triplets ($\hat{X}$, $\hat{Y}$, $\hat{Z}$) or ($\widehat{c_1}$, $\widehat{c_1}$, $\widehat{c_1}$) of color picture data are sent to a destination; specifically, the destination belongs to a set comprising:
  a local memory (53 or 54), e.g. a video memory or a RAM, a flash memory, a hard disk;
  a storage interface (55), e.g. an interface with a mass storage, a RAM, a flash memory, a ROM, an optical disc or a magnetic support;
  a communication interface (55), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface); and
  a display.

According to different embodiments of encoding or encoder, the bitstream F is sent to a destination. As an example, the bitstream F is stored in a local or remote memory, e.g. a video memory (54) or a RAM (54), a hard disk (53). In a variant, the bitstream is sent to a storage interface (55), e.g. an interface with a mass storage, a flash memory, ROM, an optical disc or a magnetic support and/or transmitted over a communication interface (55), e.g. an interface to a point to point link, a communication bus, a point to multipoint link or a broadcast network.

According to different embodiments of decoding or decoder, the bitstream F is obtained from a source. Exemplarily, the bitstream is read from a local memory, e.g. a video memory (54), a RAM (54), a ROM (53), a flash memory (53) or a hard disk (53). In a variant, the bitstream is received from a storage interface (55), e.g. an interface with a mass storage, a RAM, a ROM, a flash memory, an optical disc or a magnetic support and/or received from a communication interface (55), e.g. an interface to a point to point link, a bus, a point to multipoint link or a broadcast network.

According to different embodiments, device 50 being configured to implement an method described in relation with FIG. 3, 3a, 3c, 4a, 4c or 4e, belongs to a set comprising:
  a mobile device;
  a communication device;
  a game device;
  a tablet (or tablet computer);
  a laptop;
  a still picture camera;
  a video camera;
  an encoding chip;
  a still picture server; and
  a video server (e.g. a broadcast server, a video-on-demand server or a web server).

According to different embodiments, device 50 being configured to implement a decoding method described in relation with FIG. 2, 3b, 4b or 4d, belongs to a set comprising:
  a mobile device;
  a communication device;
  a game device;
  a set top box;
  a TV set;
  a tablet (or tablet computer);
  a laptop;
  a display and
  a decoding chip.

Figure 6:
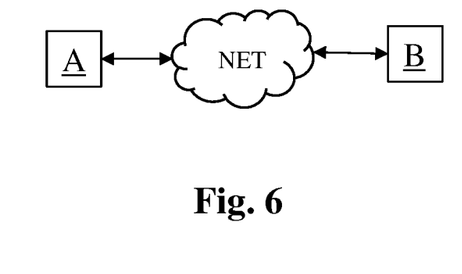
FIG. 6 shows two remote devices communicating over a communication network in accordance with a example of present principles.

According to an embodiment illustrated in FIG. 6, in a transmission context between two remote devices A and B over a communication network NET, the device A comprises means which are configured to implement a method as described in relation with the FIG. 3, 3a, 3c, 4a, 4c or 4e and the device B comprises means which are configured to implement a method for decoding as described in relation with FIG. 2, 3b, 4b or 4d.

According to a variant of the disclosure, the network is a broadcast network, adapted to broadcast still pictures or video pictures from device A to decoding devices including the device B.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for obtaining two color difference components of an output color space from three components C1, C2 and C3 representing color picture data in an input color space comprising:
    determining a first component by applying a process and an inverse process to the component C1;
    determining a first of said color difference components of the output color space based on a difference between the component C2 and said first component; and
    determining a second of said color difference components of the output color space based on a difference between the component C3 and said first component.

2. The method of claim 1, wherein determining the first component comprises quantizing the component C1 and inverse-quantizing of the quantized component C1.

3. The method of claim 1, wherein determining the first component comprises an encoding of the component C1 and a decoding of the encoded component C1.

4. The method of claim 1, wherein determining the first component comprises quantizing the component C1 followed by encoding the quantized component C1 and decoding the encoded component C1 followed by inverse-quantizing the decoded component C1.

5. The method of claim 1, further comprising applying a transfer function on the color picture data in order to obtain non-linear color picture data.

6. The method of claim 1, further comprising inverse-quantizing each component of the color picture data before applying the process to the component C1.

7. The method of claim 1, wherein the input color space is the CIEXYZ color space or the YDzDx color space.

8. A method for encoding color picture data which comprises determining color difference components for said color picture data according to claim 1.

9. The method of claim 8, wherein determining a first component by applying a process to the component C1 comprises calculating a residual of the component C1 of color picture data.

10. The method of claim 9, wherein when the component C1 is the luma component of the color picture color data, the residual of the luma component of color picture data is calculated by subtracting a low spatial frequency version of the luma component of the color picture data to said luma component of the color picture.

11. The method of claim 9, wherein when the component C1 is the luma component of the color picture color data, the residual of the luma component of color picture data is calculated by dividing the luma component of the color picture data by a backlight component.

12. A device for encoding picture data which comprises one or more processors configured to obtain color difference components according to the method of claim 1.

13. The device of claim 12, wherein determining a first component by applying a process to the component C1 comprises calculating a residual of the component C1 of color picture data.

14. The device of claim 13, wherein when the component C1 is the luma component of the color picture color data, the residual of the luma component of color picture data is calculated by subtracting a low spatial frequency version of the luma component of the color picture data to said luma component of the color picture.

15. The device of claim 13, wherein when the component C1 is the luma component of the color picture color data, the residual of the luma component of color picture data is calculated by dividing the luma component of the color picture data by a backlight component.

16. A device for obtaining two color difference components of an output of color space from three components C1, C2 and C3 representing color picture data in an input color space, comprising one or more processors configured to:
   determine a first component by applying a process and an inverse process to the component C1;
   determine a first of said color difference components of the output color space based on a difference between the component C2 and said first component; and
   determine a second of said color difference components of the output color space based on a difference between the component C3 and said first component.

17. The device of claim 16, wherein determining the first component comprises quantizing the component C1 and inverse-quantizing of the quantized component C1.

18. The device of claim 16, wherein determining the first component comprises an encoding of the component C1 and a decoding of the encoded component C1.

19. The device of claim 16, wherein determining the first component comprises quantizing the component C1 followed by encoding the quantized component C1 and decoding the encoded component C1 followed by inverse-quantizing the decoded component C1.

20. The device of claim 16, wherein the one or more processors are further configured to apply a transfer function on the color picture data in order to obtain non-linear color picture data.

21. The device of claim 16, wherein the one or more processors are further configured to inverse-quantize each component of the color picture data before applying the process to the component C1.

22. The device of claim 16, wherein the input color space is the CIEXYZ color space or the YDzDx color space.

23. Non-transitory storage medium carrying instructions of program code for determining two color difference components of an output space from three components C1, C2 and C3 representing color picture data in an input color space by:
   determining a first component by applying a process and an inverse process to the component C1,
   determining a first of said color difference components of the output color space based on a difference between the component C2 and said first component; and
   determining a second of said color difference components of the output color space based on a difference between the component C3 and said first component.

* * * * *